W. C. KITT.
EGG CARRYING PACKAGE.
APPLICATION FILED NOV. 13, 1916.
1,221,804.
Patented Apr. 3, 1917.
2 SHEETS—SHEET 2.
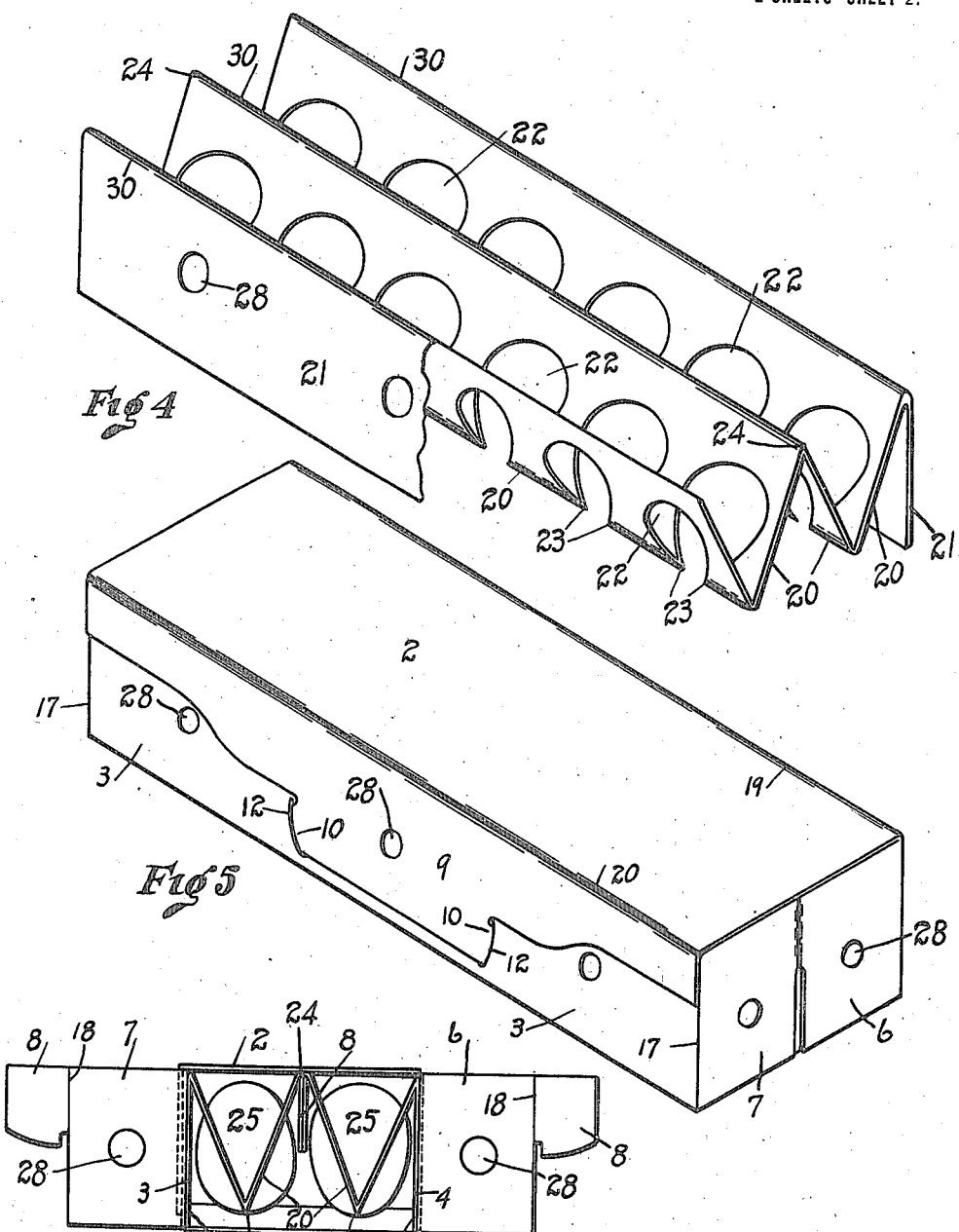
Witnesses
R. Brown Jr.
L. M. Dunlap.
Inventor
William C. Kitt
by John W. Strehli
Attorney

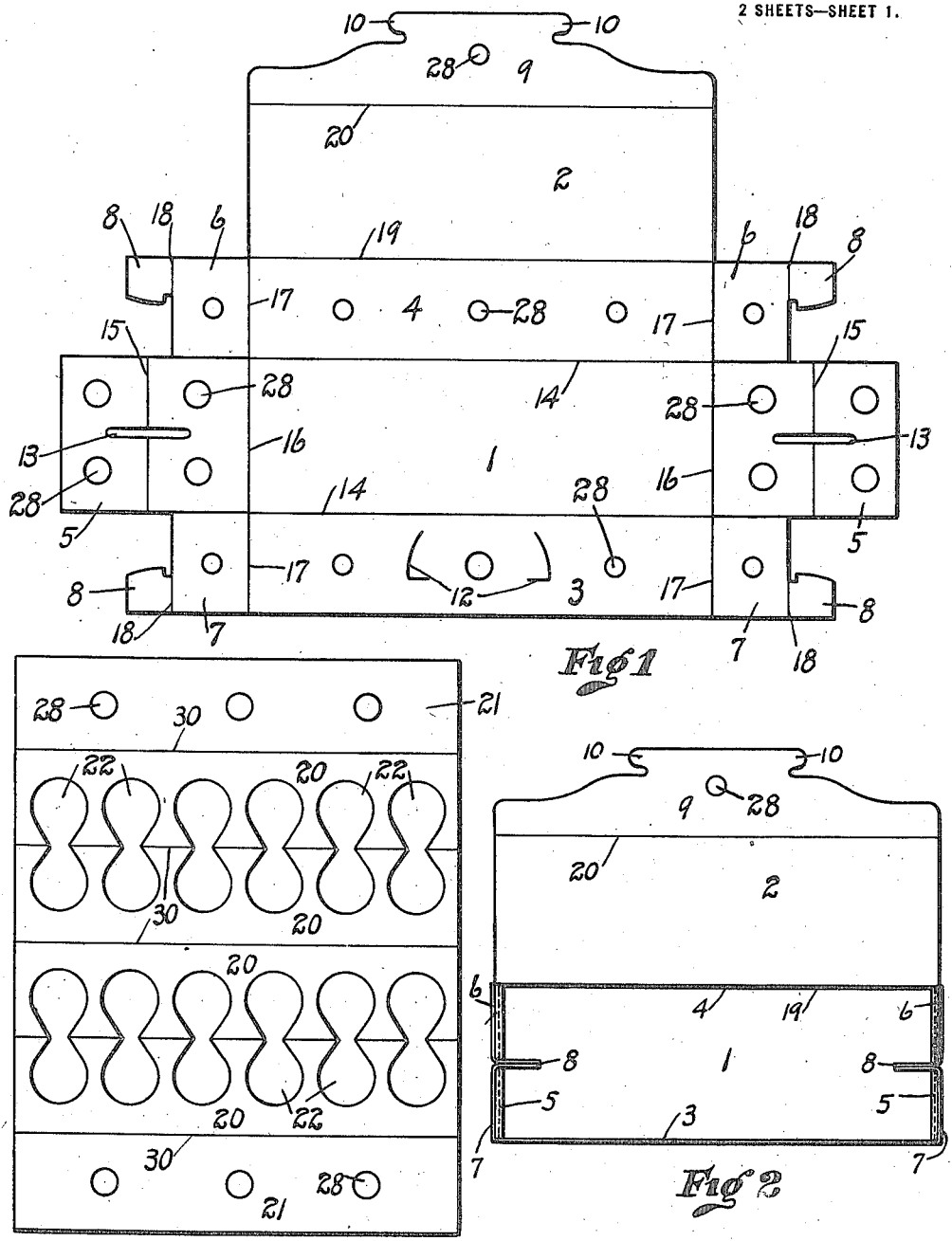

UNITED STATES PATENT OFFICE.

WILLIAM C. KITT, OF CINCINNATI, OHIO.

EGG-CARRYING PACKAGE.

1,221,804. Specification of Letters Patent. Patented Apr. 3, 1917.

Application filed November 13, 1916. Serial No. 131,134.

*To all whom it may concern:*

Be it known that I, WILLIAM C. KITT, a citizen of the United States, residing at the city of Cincinnati, in the county of Hamilton and State of Ohio, have invented certain new and useful Improvements in Egg-Carrying Packages, of which the following is a specification.

The object of my invention is to produce a simple, cheap and highly efficient egg carrying package for retail, wholesale, commercial or parcel post use. It belongs to that class of egg carriers which are formed of a separate box or shell and a separate tray for carrying and supporting the eggs.

My box or shell is formed of a series of scored parts and flaps which, when folded together, form a box of novel and unique construction which is very strong, and the parts when folded, are locked together and provided with inwardly extending supports at each end for holding, suspending and supporting the egg carrying tray in said box.

My egg carrying tray is composed of a series of folds, or wide and deep corrugations, or V-shaped troughs lying contiguous or parallel to one another, the outer ends of flaps being vertical when in the box. These folds, deep corrugations or V-shaped troughs are provided with oppositely disposed peculiar shaped slots, narrowed at their meeting points, into which the eggs fit and are supported, the eggs being held suspended in the slots; my invention thus suspending the tray in the box and suspending the eggs in the tray, and in this manner the breakage of eggs is cut to a minimum.

In the accompanying drawing forming part of this specification;

Figure 1, is a plan view of the box or shell unfolded,

Fig. 2, is a top or plan view of the box folded, with the lid opened up,

Fig. 3, is a plan view of the egg supporting tray unfolded,

Fig. 4, is an isometric view of the egg supporting tray, removed from the box and partly broken away on one side to show construction, Fig. 5, is an isometric view of the complete package, and Fig. 6, is an end view of the box and tray, the end of the box being opened up.

I provide a box or shell and a tray or supporter for the eggs, which is placed in said box.

The box is formed of a bottom 1, top or lid 2, sides 3 and 4, ends 5, which are a continuation of bottom 1, and end pieces 6 and 7, which are a continuation of sides 3 and 4; each of these end pieces 6 and 7 are provided with a locking flap 8. The lid or top 2 is provided with a closing or locking flap 9, provided with fingers 10 which enter slits 12 in side 3, to lock the box together and hold it in closed form. The ends 5 are provided with slots 13. The box or shell is put together as follows, to wit:

The sides 3 and 4 are first raised or folded upward bending on score lines 14, the ends 5 are then folded together on score lines 15 so as to make the ends double, these double ends are then folded or raised up folding on the score line 16; this makes the slots 13 run to the top edge of the doubled or folded ends 5 and these slots extend down about half way of said folded ends. The end pieces or flaps 6 and 7 are then folded in against said doubled ends 5, folding on score lines 17; the locking flaps 8—8 are then bent, yielding on score lines 18, and inserted into slots 13 locking the box ends together, and forming inwardly extending double supports for supporting and suspending the tray. The lid or top 2 is then folded over onto the box body, folding on score line 19, the locking flap 9 is then bent down folding on score line 20, the fingers 10 are slipped into slits 12 and the box is locked.

The tray for carrying the eggs is stamped flat as shown in Fig. 3 and then folded on score lines 30 into the shape shown in Fig. 4, that is, into a series of deep corrugations 20 resembling a number of V-shapes or troughs, lying side by side, the side flaps or parts 21 being vertical when the tray is folded and placed in the box or shell. In this tray I punch or stamp elongated slots or holes 22 formed of two rounded or circular heads, oppositely disposed and becoming narrower as they approach to form a neck or narrowed short part 23, so that when the tray is folded and in the box, the eggs will rest on or near to said neck 23 and be supported in said rounded parts of the slots 22, pressing against the walls around the slots.

The paper, card board, or the like, out of which the tray is made will yield and press against the eggs and hold them against displacement in connection with said holes 22.

It will be noted that two of the score lines 30 run in a line midway of the length of the slots 22, so that when folded, the oppositely disposed egg holding slots will be formed together with the neck 23. These slots 22 may be of any desired contour or shape and of any suitable size.

The ends 24 at the apex of the center fold or V-shape fit over and rest on the double flaps 8 in the box at each end and thus the tray is supported and suspended in the box.

The side or vertical flaps 21 preferably reach to the bottom of the box to assist in supporting the V-shaped troughs and keeping them suspended.

It will be observed that the slots which support the eggs are continuous, that is, they each have the large circular part and are connected by the narrow slot where they both meet at the bottom of the V-shaped troughs. It will also be observed that I do not form separate compartments for holding each egg, the eggs being supported by the walls of the slots, the eggs partly extending through said slots into the spaces between the V-shaped troughs and at the bottom said eggs are supported by the peculiar formation of the slot at the bottom of the V-shaped troughs.

The eggs are marked 25 and the ventilating holes are marked 28.

It will be observed that the ends of the box, where strength is needed are triple fold and when the tray is in the box a double wall is formed by the sides 3 and 4 and the flaps 20 of the tray.

The eggs can be quickly placed in the tray into the oppositely disposed slots 22 and be supported against breakage, which, by the use of my improved egg carrier, will be reduced to a minimum.

The box and tray can be shipped flat and readily assembled and the carrier can be placed into the ordinary egg crate and used instead of the flats or fillers therein. The tray holding the eggs can be lifted out of the box very readily.

While I have described one form of constructing my new egg carrying package, it will be obvious that the same is capable of some modifications without departing from the principle and spirit of the invention, and I wish to be understood as claiming that such modifications will still fall within the scope of my invention.

What I claim as new and my invention and desire to secure by Letters Patent is:

1. In an egg carrying package, a foldable box, locking devices in the ends of said box, said locking devices extending inward to form supports, an egg tray, said egg tray fitting in said box, and suspended on said supports.

2. In an egg carrying package, a foldable box, the ends whereof are provided with flaps capable of being folded and extending inwardly into the box to form extensions, an egg tray, said egg tray fitting in said box on said extensions and suspended therefrom.

3. In an egg carrying package, a box, an egg carrying tray, said egg carrying tray suspended in said box from the ends thereof, and means in said egg carrying tray for suspending, cushioning and locking the eggs therein.

4. In an egg carrying package, a foldable box provided with ends having inward extensions, an egg tray, said egg tray formed of a number of V-shaped troughs, said egg tray suspended on said inward extensions, the walls of said V-shaped troughs provided with rounded slots largest at their upper extremity and narrowed so as to meet at the bottom and form oppositely disposed slots for holding the eggs.

5. In an egg carrying package, a foldable box provided with ends having inward extensions, an egg tray, said egg tray formed of a number of V-shaped continuous parallel troughs, said egg tray suspended on said inward extensions, the walls of said V-shaped troughs provided with continuous slots running from one wall to the other so as to be oppositely disposed, said slots and V-shaped troughs supporting the eggs.

6. In an egg carrying package, a foldable box, the ends of said box provided with inward extensions, an egg tray, said egg tray formed of troughs having oppositely disposed slots, said slots largest at the top and narrowing and meeting at the bottom so that narrowed edges are formed at the bottom of the troughs on which the eggs can rest, the egg tray suspended in said box on said extensions.

7. In an egg carrying package, a box, an egg tray, said egg tray formed of troughs having oppositely disposed slots, said slots being larger at the top and narrowing and meeting at the bottom so that narrowed edges are formed at the bottom of the troughs on which the eggs can rest, the egg tray being suitably supported in said box.

Witness my hand at Cincinnati, Ohio, June 30th, 1916.

WILLIAM C. KITT.

Witnesses:
H. E. CARSTENS,
L. M. DUNLAP.